July 8, 1958
A. A. MARKSON
2,842,147
FORCE RESPONSIVE DEVICES
Filed Sept. 13, 1950
5 Sheets-Sheet 1
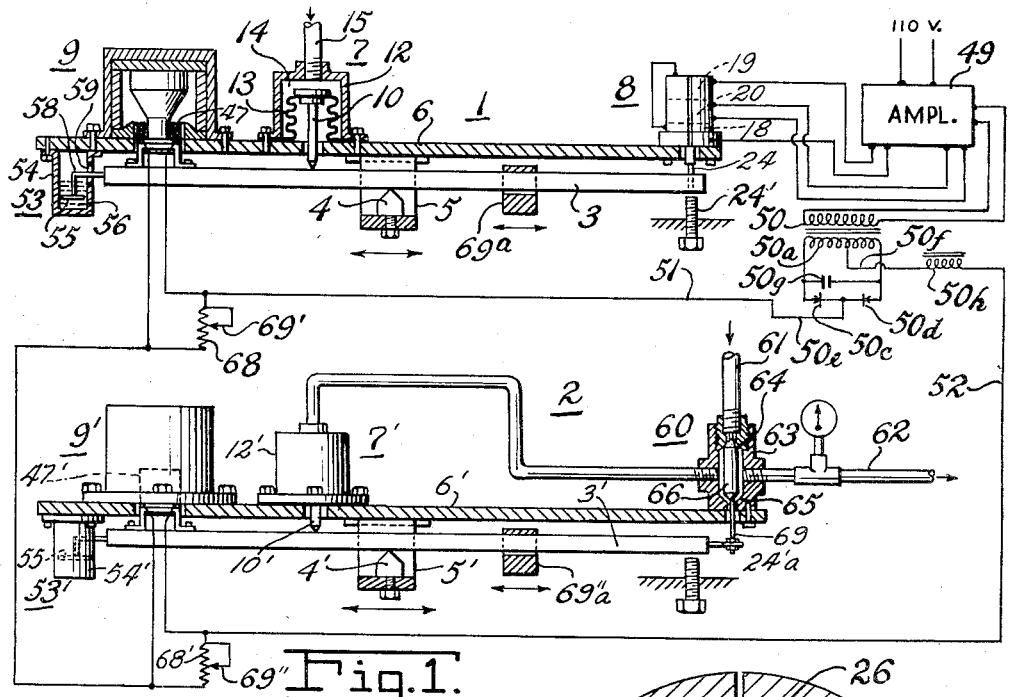
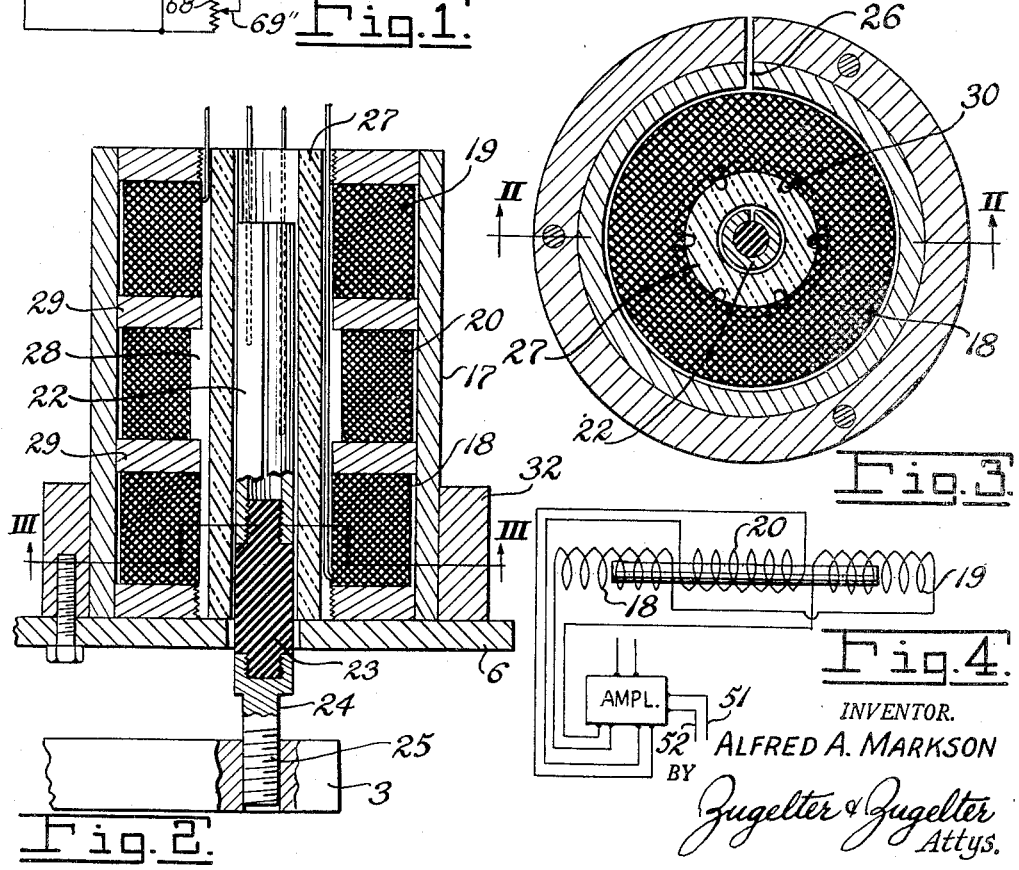
INVENTOR.
ALFRED A. MARKSON
BY
Zugelter & Zugelter
Attys.

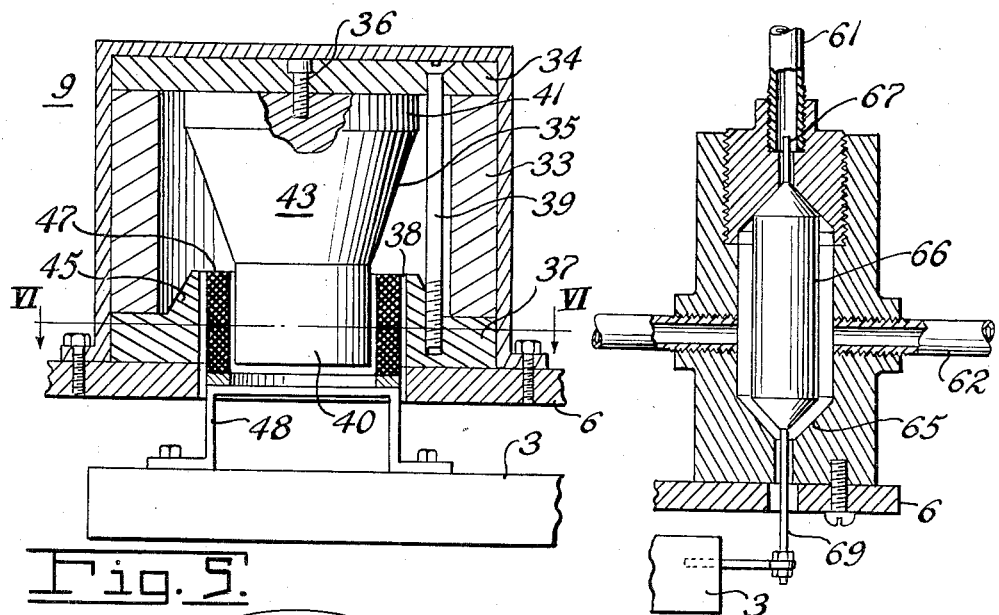
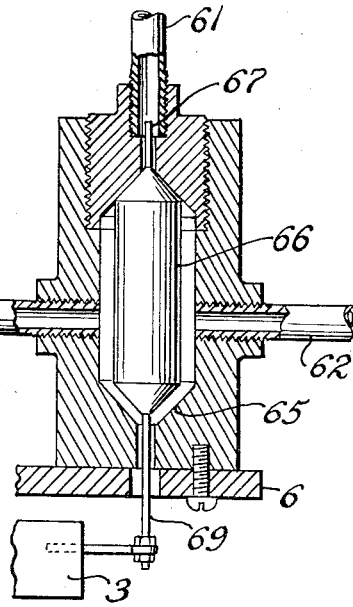
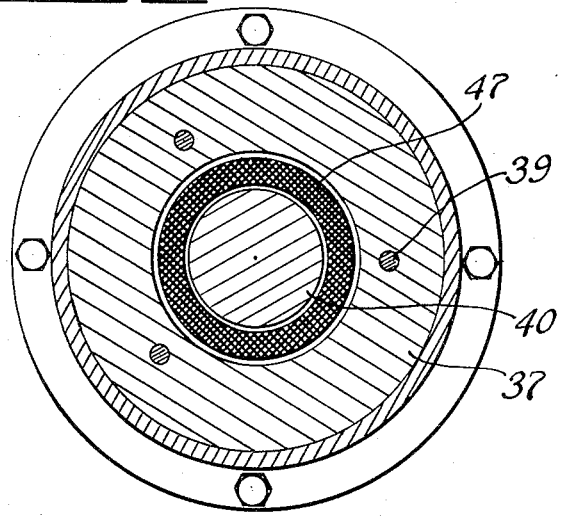

July 8, 1958  A. A. MARKSON  2,842,147
FORCE RESPONSIVE DEVICES
Filed Sept. 13, 1950  5 Sheets-Sheet 3

INVENTOR.
ALFRED A. MARKSON
BY
Zugelter & Zugelter
Attys.

July 8, 1958  A. A. MARKSON  2,842,147
FORCE RESPONSIVE DEVICES
Filed Sept. 13, 1950  5 Sheets-Sheet 5
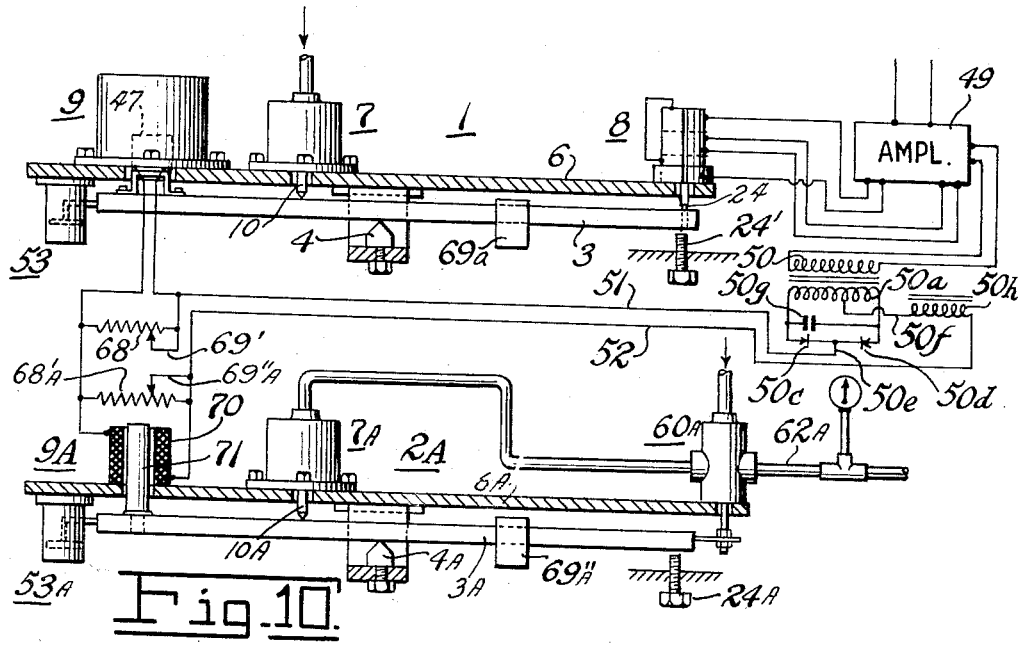
Fig.10.
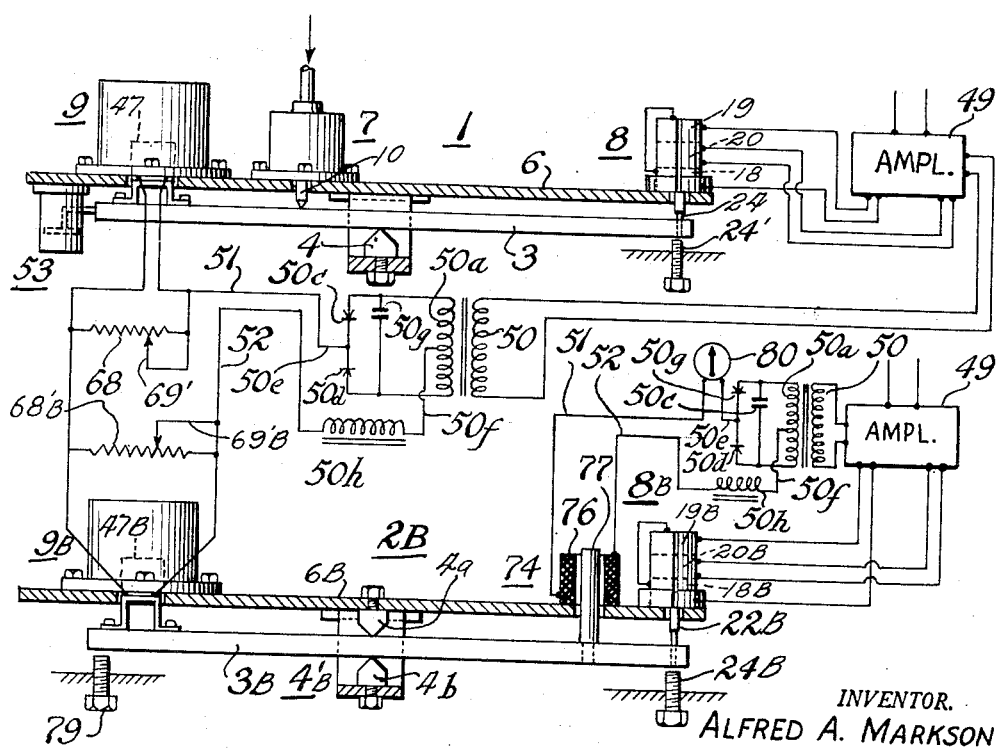
Fig.11.
INVENTOR.
ALFRED A. MARKSON
BY
Attys United States Patent Office 2,842,147
Patented July 8, 1958

2,842,147

FORCE RESPONSIVE DEVICES

Alfred A. Markson, Mount Lebanon Township, Pa., assignor to Hagan Chemicals & Controls, Inc., a corporation of Pennsylvania Application September 13, 1950, Serial No. 184,569

14 Claims. (Cl. 137—85)

This invention relates to force responsive devices which are capable of receiving a variable force, either pressure or electrical, and converting that force either into an electric current output or a pressure output and which is provided with means responsive to the output of the device for balancing the input force for all values of input.

An object of this invention is to provide devices of the type set forth that shall be extremely sensitive and accurate throughout the full range of operation.

Specifically stated, it is an object of the invention to provide a device which is designed to respond to a variable force produced by a variable pressure, to convert that force to a corresponding variable electric current output which may be used for regulating or indicating purposes, and which embodies an electro-responsive means that exerts a force that balances and opposes the pressure force in proportion to the current output of the device.

Another object of the invention is to provide a device which is capable of acting as a regulator or as an indicator, having electro-responsive means to which a variable current is supplied for exerting a force that is converted into a pressure force whose magnitude varies with the magnitude of the force of the electromagnetic means, and which device is provided with means responsive to the pressure output for exerting a force that balances the force of the electromagnetic means.

A further object of the invention is to provide a device having means for receiving a variable input signal and developing a force proportional thereto, means responsive to said force for developing an output signal and a balancing means that balances the force of the input signal, the device being so designed that the relationship between the input and output signals may be linear or non-linear.

The above and other objects of the invention will in part be apparent, and will in part be obvious from the following description taken in conjunction with the accompanying drawings, in which:

Figure 1 is a more or less diagrammatic view, partly in section, of a sending and a receiving device, each embodying features of the invention, said devices being coupled together to operate as a regulating system;

Fig. 2 is an enlarged view in section taken on line II—II of Fig. 3 showing details of construction of a differential transformer embodied in the sending device of Fig. 1 and in devices illustrated in Figs. 8 through 11, inclusive;

Fig. 3 is a view in section, taken on line III—III of Fig. 2;

Fig. 4 is a more or less diagrammatic view of a differential transformer such as shown in Fig. 2, by means of which the operating principles thereof are depicted;

Fig. 5 is a view in vertical section, partly in side elevation, of an electromagnetic device embodying a strong permanent magnet and a movable coil winding, said magnet and coil winding being embodied in various of the devices illustrated in Figs. 1 and 8 to 11 inclusive;

Fig. 6 is a view in section, taken on line VI—VI of Fig. 5;

Fig. 7 is an enlarged view in vertical section showing details of construction of an escapement valve embodied in certain of the devices illustrated in Figs. 1, 8, 9 and 10;

Figure 8:
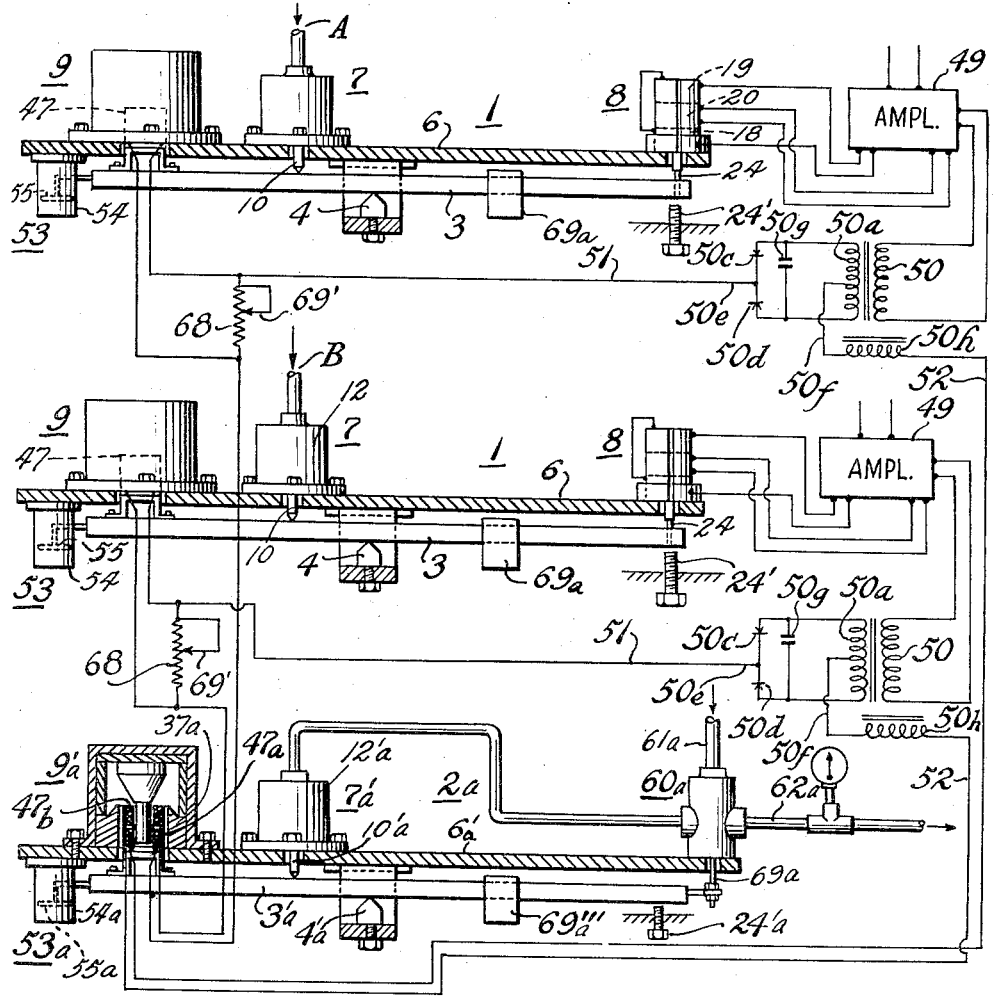
Fig. 8 is a more or less diagrammatic view, partly in section, of a system embodying two sending devices such as shown in Fig. 1, and one receiving device, the arrangement being such that the outputs of the two sending devices are received and totalized by the receiving device.

Fig. 10 is a more or less diagrammatic view of a sending device such as shown in Fig. 1 and a receiving device which is modified in such manner that the pressure output of the receiving device varies as the square of the magnitude or value of the current output of the sending device; and Fig. 11 is a view similar to Fig. 10 in which the receiving device is modified to develop a current output that is proportional to the square of the magnitude or value of the current input thereto, the current input being the current output of the sending device.

Throughout the drawings and the specification, like reference characters indicate like parts. In Fig. 1 of the drawings, a sending device or sender 1 and a receiving device or receiver 2 are illustrated, each of which embodies features of the invention. The term sending device or sender is used in this specification to denote a machine or device that is designed to receive a variable input signal, for example, a pneumatic pressure or current input whose magnitude or value varies with some condition to be measured and/or controlled, and converts that pressure into an output signal, either electrical or in the form of a pressure, which is transmitted or sent to a receiving device or receiver. The particular sender 1 illustrated in Fig. 1 is provided with an electric device that is energized by the output current thereof and balances the input signal. Thus, for every value of input signal there will be a corresponding value of output signal.

The term receiving device as used in this specification denotes a machine or device that receives a variable signal from a sending device and converts that signal into an output signal, either electrical or pressure in character, whose magnitude may be either linearly or non-linearly proportional to the received signal. The term receiver also denotes a device having means that are responsive to the output signal thereof and develops a force that is proportional to the output for balancing the input signal. Thus, for every value of input to the receiver, there will be a corresponding output whose value is either linearly or non-linearly proportional to the input signal, depending on the design of the device.

Device 1 comprises a beam 3 mounted on a knife edge 4 carried by a stirrup 5 which is adjustably secured to a support or base 6. The device includes, also, an input signal responsive means 7 and output device 8, the output of which is proportional to movement of beam 3 as affected by means 7, and an electromagnetic balancing means 9 that is responsive to the output of device 8. As shown, means 7 is disposed to exert a force through a push rod 10 on beam 3 tending to turn it in one direction about knife edge 4, and that device 9 is coupled to the beam in such fashion that the force developed by it and acting on beam 3 opposes and balances the force exerted thereon by means 7.

The specific form of signal input means 7 is one that is designed to respond to a variable pressure such as air pressure. It comprises a housing 12 within which is disposed a bellows 13, the lower end of which is secured in pressure-tight relationship to the open end of housing 12 thereby forming a pressure-tight chamber 14 to which a variable signal pressure is delivered by a pipe 15. As shown, push rod 10 is secured to the closed end of the bellows 13 whereby as the bellows contracts or expands, the resulting motion and force imposed on the bellows is transmitted through push rod 10 to beam 3.

Device 8, as specifically illustrated, comprises a differential transformer having a magnetic core 17, a pair of secondary or output windings 18 and 19 connected in differential series relation to each other, and a primary or input winding 20. As shown, the input winding 20 is disposed between the windings 18 and 19, the three windings being coaxial of the core.

The differential transformer includes also a movable core member 22 disposed within and coaxially of the windings 18, 19 and 20. As shown in Fig. 2, core 22 is in the form of a hollow split tube, the tube being split to prevent the core from acting as a short-circuited secondary. One end of core 22 is connected by a non-magnetic and insulating link 23 to a connecting member 24 which in turn is adjustably secured to one end of beam 3 by means of a screw thread connection 25. When core 22 occupies a position such as shown in Fig. 2, the opposite ends thereof project or extend substantially equal distances into windings 18 and 19; therefore, the voltage at the output terminals thereof will be zero, as the voltage induced in these windings will be equal and opposite. If the core is moved upwardly from this zero or neutral induction position so that a larger part of the core 22 is within winding 19 and a correspondingly lesser portion is within winding 18 the output voltage thereof will be equal to the voltage in winding 19 minus the voltage in winding 18. Thus, as core 22 is moved from its zero induction position upwardly into winding 19, the output voltage of windings 18 and 19 will vary from zero to the maximum value of voltage induced in winding 19. The particular value of voltage induced for intermediate positions of core member 22 will be proportional to the difference between the voltages induced in windings 19 and 18, respectively. The output voltage in windings 18 and 19 will be alternating. If the core 22 is moved downwardly into winding 18 through the zero or neutral induction position, the voltage output of coils 18 and 19 will pass through zero and then increase, but the net voltage will be proportional to the difference between voltage of winding 18 and the voltage of winding 19.

If core member 22 is actuated above or below the position where the output of windings 18 and 19 is zero, there will be a voltage output that is equal to the difference between the voltage in windings 19 and 18 or vice versa. However, since the output is alternating, devices responsive thereto can not distinguish on which side of the zero position core 22 is in. Furthermore, since the input signal to sender 1 varies from zero to a maximum and the maximum is always on the same side of zero, namely, on the plus side, it follows that beam 3 must be provided with a stop to prevent the output voltage of transformer 8 from decreasing from one side of zero through zero to the other side of zero in an increasing direction, for this would destroy the zero point of sender 1. The means illustrated is a stop 24A located as shown. Stop 24A prevents core 22 from being actuated downwardly through the zero or neutral induction position thereof so that the voltage output of windings 18 and 19 will vary from zero to the maximum of winding 19, with intermediate values that are equal to the voltage of winding 19 minus the voltage of winding 18. Thus, as the pressure in chamber 14 increases from zero to a maximum value, core 22 will be moved upwardly into the differential transformer from the zero or neutral position more and more into the zone of coil winding 19. Therefore, the output current of device 8 will always be on the same side of zero, which side may be conveniently designated the positive side, and will never pass through zero and produce an output on the negative side of zero.

In the specific form of differential transformer shown in Fig. 2, the magnetizing core 17 is shown as a cylindrical external core. This core is split lengthwise as at 26 to prevent it from acting as a short-circuited secondary. Within core 17 is a hollow sleeve 27 of a refractory material having sufficient electric insulating properties. Core 22 is disposed within the refractory member 27. The refractory member 27 is provided at about its middle section with a flange 28 against which spacers 29 abut. These spacers separate secondary windings 18 and 19 and provide a space for accommodating the primary winding 20. In the external surface of member 27 a plurality of vertical slots or grooves 30 are formed, specifically, six in number, to accommodate the six terminals of the three windings 18, 19 and 20, there being two terminals for each winding. By means of these slots or grooves the terminals of the windings may be brought out through the same end of the differential transformer, as shown, and connected as indicated by the schematic diagram of Figure 4. The lower end of the differential transformer assembly is adjustably supported in a split ring 32 secured to the base 6 as shown in Figs. 1 and 2. By adjustably supporting the transformer assembly in split ring 32 and by means of the adjustable connection of the core 22 to beam 3, core 22 may be adjusted to its neutral or zero position when beam 3 is in its neutral or zero position.

The electromagnetic device 9 is shown more clearly in detail in Figs. 5 and 6. This device comprises a permanent magnet and a coil winding 47. The permanent magnet comprises a cylindrical member 33 of magnetic material, a circular plate 34 extending across and secured to the upper end of member 33, and an internal core member 35 that is secured by means of a screw 36 to plate 34. The opposite or lower end of cylindrical member 33 is provided with a pole piece 37, having a circular aperture 38 in the central portion thereof. The pole piece 37 is secured to end plate 34 by means of bolts 39, preferably of non-magnetic material.

Core member 35, as shown, is provided with a cylindrical section 40 that extends into the opening 38 in the pole piece 37 and an enlarged cylindrical base section 41 abutting end plate 34. Between the sections 41 and 40 the core member 35 is shaped like the frustum of a cone, said section being designated by reference character 43. The pole piece 37 is provided at its central portion with a cone-shaped portion 45 that projects inwardly of member 33 for a distance corresponding approximately to the inner end of cylindrical section 40. In the space between section 40 and the cone-shaped section 45 of pole piece 37 the coil winding 47 is disposed. This winding comprises a relatively large number of turns of wire suitably wound, as on a spool, whereby it may be secured at one end to a support element 48 which, in turn, is secured to beam 3.

The core members 34, 35 and pole piece 37 are made from metals which form a strong, permanent magnet when magnetized. For example, end plate 34 may be made of soft iron, core member 35 may be made of aluminum nickel cobalt steel alloy known to the trade as Alnico, and the pole piece 37 may be made of soft iron. By making the permanent magnet assembly in the form shown and of the particular metals indicated, the magnet may be magnetized to a high degree and it will retain its magnetization substantially without change for an indefinite period of time. Therefore, the flux density through the air gap in which coil winding 47 is disposed will be substantially constant. In a preferred form of the invention direct current is supplied to winding 47. The force exerted by the winding 47 on the beam 3 will be linearly proportional to the value of the direct current flowing in the coil at any instant.

In order that the magnitude of the current output of differential transformer 8, as delivered to coil winding 47, will be such that a substantial force will be developed by winding 47, the output of transformer 8 is amplified by means of an amplifier 49. The amplifier 49 is illustrated only schematically. It embodies transformer windings for supplying relatively low voltage to the primary windings 18 and 19 of the differential transformer, and amplifying apparatus for amplifying the output of winding 20.

The alternating current output of amplifier 49 is supplied to the primary winding 50 of a step-up transformer. The output voltage of its secondary winding 50a is rectified by rectifiers 50c and 50d connected as shown to a common conductor 50e. The midpoint or middle tap of the winding 50b is connected to a conductor 50f. Conductors 50e and 50f are connected to supply conductors 51 and 52 across which the coil windings 47 of sender 1 and receiver 2 are connected in series. A condenser 50g having a capacity of about 1 m. f. is connected across the terminals of winding 50b and a choke winding 50h is connected in the center tap conductor 50f to provide a smooth rectified output voltage. The output voltage range of transformer 8 may vary from zero to about 0.6 volts. This voltage is amplified and stepped up, preferably in a ratio of about 300 to 1. The voltage across conductors 51 and 52 will therefore vary over a range of zero to about 180 volts maximum.

Device 1 is also provided with a stabilizer 53, the function of which is to prevent oscillation or hunting of beam 3. Stabilizer 53, as illustrated, is a dash-pot containing a liquid such as oil of appropriate viscosity. The dash-pot comprises a cylindrical container 54 that is secured to base 6 and a loosely fitting piston 55 within container 54 and which operates in a fluid 56 such as oil. The piston is connected by a support 58 to one end of the beam 3, the support extending through an opening 59 in a wall of container 54. Device 53 damps beam 3 and gives stability of operation to the device.

Receiving device 2 is substantially similar to device 1 in all respects except in the output device 60 thereof and, therefore, similar and corresponding parts which have been described in connection with device 1 will be designated by the same reference characters with primes affixed.

The particular output device 60 illustrated is an escapement valve adapted to transmit pressures from a supply pipe 61 which is connected to a source of supply of pressure such as compressed air at constant pressure, to a sending or output line 62 and to device 7′. The escapement valve is so designed that the pressure delivered to line 62 and to device 7′ will vary over a wide range, for example, from zero pounds gauge pressure to 60 pounds per square inch gauge pressure or to any other predetermined maximum value. Such maximum value will be equal to the value of pressure in the supply pipe 61. In the receiving device 2 the electromagnetic device 9′ thereof acts as the input signal-receiving device and device 7′ is the balancing device, whereas, in device 1 device 7 is the input signal device, and electromagnetic device 9 is the balancing device.

The escapement valve 60 comprises a valve body 63 having a tapered seat 64 at the inlet port and a tapered seat 65 at the exhaust port, the exhaust port leading to the atmosphere, and a valve 66, the opposite ends of which are tapered or of cone-shape so that they may seat on the respective seats 64 and 65. The upper end of valve 66 is provided with a guide stem 67 that extends upwardly through the inlet port and with a stem 69 at its lower end which is adjustably connected to beam 3′ as shown.

When valve 66 is in the position shown in Fig. 7, the inlet port is closed and the outlet port is open to the atmosphere; therefore, the pressure sent out by the valve to line 62 and to device 7′ will be zero gauge pressure. When the valve is seated on the exhaust port seat 65, the inlet port is wide open and the exhaust to atmosphere is shut off; therefore, the pressure transmitted by the valve will increase to a maximum value, a value which is equal to the pressure in the supply pipe 61. As valve 66 is moved to positions intermediated the two extreme positions above-described, the pressure delivered to line 62 and to device 7′ will vary in incremental amounts between zero pounds gauge pressure and 60 pounds per square inch gauge pressure or whatever the maximum pressure of the supply pipe is.

As shown in Fig. 1, the amplified output of differential transformer 8 is passed through the coil windings 47 and 47′ of devices 9 and 9′ of the sender 1 and receiver 2, respectively, the coils being in series. In order that the output pressure of valve 60 may correspond value for value with the input pressure to device 7 of sender 1, shunt resistors 68 and 68′ connected across the input terminals of coils 47 and 47′, respectively, and these resistors are provided with slide wire contacts 69′ and 69″, respectively. Thus, by adjusting resistors 68 and 68′ the forces exerted by the coils of the sender 1 and receiver 2 may be caused to match; therefore, if the range of pressures received by device 7 of sender 1 is from zero pounds gauge to say 60 pounds gauge then the balancing pressure in device 7′ of receiver 2 will correspond pound for pound over the range of zero to 60 pounds and vice versa, assuming, of course, that the areas of the bellows thereof are equal and the forces act at the same distances from fulcrums 4 and 4′ on beams 3 and 3′, respectively.

In order that the dead weight of the various parts which rest on the respective beams 3 and 3′ of sender 1 and receiver 2 may be counterbalanced, adjustable weights 69A and 69′A are mounted on the beams as shown. By adjusting the position of weights 69A and 69″A each beam may be caused to take a balanced position when devices 7 and 9′ exert no forces on beams 3 and 3′, respectively.

If it be assumed that the input pressure signal to device 7 of sender 1 is zero then core 22 of differential transformer 8 will be in its zero or neutral position as previously described. There will therefore be no current output from transformer 8 and no current transmitted to the coil windings 47 and 47′ of devices 9 and 9′ of senders 1 and 2. If the input pressure signal to device 7 increases from zero to a positive value, beam 3 will turn counter-clockwise on fulcrum 4 by reason of the force imposed thereon by bellows 13 through push rod 10. Core 22 will therefore be moved upwardly from its zero or neutral position whereby current is induced in winding 19. As described, supra, this current is amplified and rectified and delivered to windings 47 and 47′ of devices 9 and 9′ of sender 1 and receiver 2. The flow of current in the winding 47 of sender 1 will exert a force on beam 3 that opposes the force of bellows 13. As soon as the turning force of coil 47 balances the force of bellows 13, core 22 will come to rest. The current flowing in coil 47′ of receiver 2 will exert a force on beam 3′ thereof tending to turn it clockwise on fulcrum 4′ whereby valve 66 is moved away from the inlet port so that pressure fluid such as compressed air may flow into pipe 62 and to housing 12 of device 7′ thereof. The pressure will continue to increase in pipe 62 and in housing 12′ until the turning moment of the force applied by push rod 10′ to beam 3′ is equal and opposite to the turning moment of the force of winding 47′ on the beam. When balance occurs, the beam comes to rest. As the pressures delivered to housing 12 of sender 1 increase towards the maximum value of the input signal pressure, the current output of differential transformer 8 will correspondingly increase. The ouput of transformer 8 will act on receiver 2, as above described, whereby the output pressure of valve 60 will continue to increase and follow the input signal pressure to the sender 1. If the signal input pressure to sender 1 decreases, a corresponding reduction in pressure will occur in line 62 and housing 12' of device 7' of receiver 2.

In Figure 8 of the drawing two senders 1 and one receiver 2a are illustrated in a system whereby the individual outputs of senders 1 resulting from input signals A and B thereto, respectively, will be received and totalized by electromagnetic device 9'a of receiver 2a. Device 9'a acts on beam 3'a and causes a pressure to be developed in line 62a that is proportional to the sum of the outputs of senders 1 resulting from separate and distinct signals A and B. The input signals A and B may, as in the case of sender 1 of Figure 1, be separate air pressures which vary from, say, zero pounds gauge to a predetermined maximum gauge, say, 60 pounds per square inch, for example.

As illustrated, senders 1 of Fig. 8 are identical in construction to sender 1 of Fig. 1; therefore, similar and corresponding parts are designated by the same reference characters. Receiver 2a of Fig. 8 is identical in all respects to receiver 2 of Fig. 1 except that the electromagnetic device 9'a thereof is provided with two coils 47a and 47b instead of one coil 47' as in the case of the receiver of Fig. 1. As shown in Fig. 8, coils 47a and 47b are mounted one on the other and secured to beam 3'a and they are disposed in the air gap of the pole piece 37a. Since coils 47a and 47b are subjected to a constant field the pull of the two coils or the force exerted thereby on beam 3'a will be proportional to the sum of the currents traversing these coils. The current traversing the coil 47a will be equal to the current traversing the coil 47 of device 9 of sender 1 that responds to input A, and the current traversing coil 47b will be equal to the current traversing the coil of sender 1 that responds to input signal B. The total force of coils 47a and 47b will act on beam 3'a and turn it in clockwise direction about fulcrum 4'a, whereby valve 60a is acuated in a direction to increase the pressure in line 62a to a value at which the pressure on the balancing device 7'a will develop a turning force on beam 3'a sufficient to resist and balance the turning force of coils 47a and 47b; therefore, the value of the output signal pressure of valve 60a will be proportional to the sum of the outputs of differential transformers 8 of the two sending devices 1 and consequently proportional to the sum of the input signals A and B.

Figure 9:
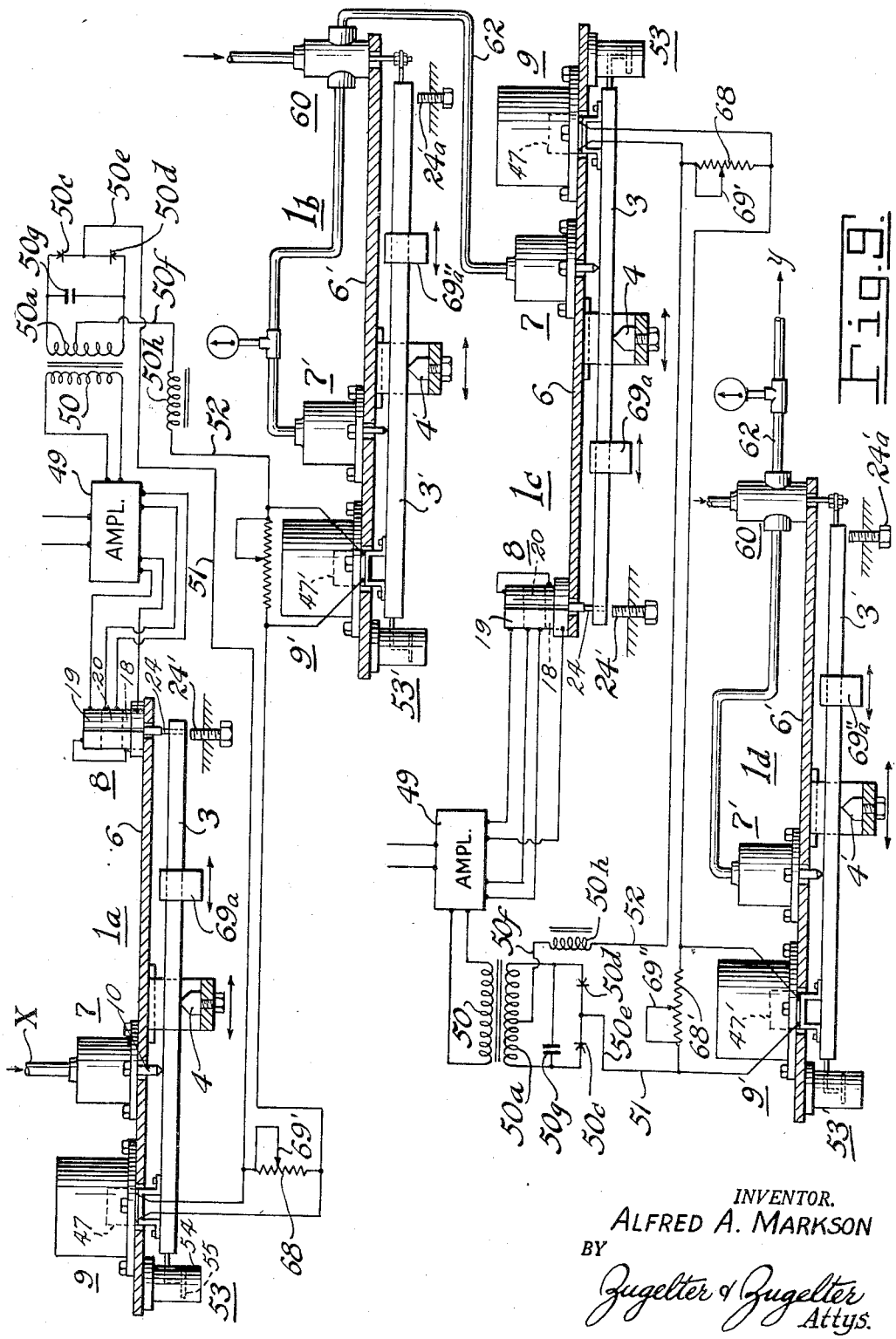
Fig. 9 is a view similar to Fig. 1 in which the arrangement of Fig. 1 is duplicated to provide repeated transmission of an input signal over relatively long distances to some remote point, the output signal at the remote point being utilizable, for example, for indicating purposes, regulating purposes, or both.

In Figure 9 a repeater system is shown. As specifically illustrated, the repeater system comprises two sending and receiving arrangements such as shown in Fig. 1, connected in series; for example, sender 1a and receiver 1b correspond, respectively, to sender 1 and receiver 2 of Fig. 1. Sender 1c and receiver 1d of Fig. 9 correspond in function and construction to sender 1a and receiver 1b but sender 1c and receiver 1d act to repeat the output of receiver 1b. The arrangement shown in Fig. 9 is one which lends itself to the transmission of an input signal over relatively great distances to some remote point and the conversion of the input signal to an output signal at such point. The output at the remote point may be utilized for indicating purposes, the regulation of apparatus in accordance with the original input signal or for both indication and regulation, as is well understood by those skilled in this art.

If the initial input signal signal to sender 1a is designated X, that input signal will be converted into an output signal by its differential transformer 8, and delivered to receiver 1b. Receiver 1b converts the electric output signal from sender 1a into a pneumatic pressure that is delivered to pipe 62 and by it to the input signal device 7' of sender 1c. The input signal to device 7' of sender 1c is converted by its differential transformer 8 into an electric output which is amplified and transmitted to the electromagnetic device 9' of receiver 1d. The effect of the electric input to device 9' is, as previously described, to cause valve 60 to develop an output pressure or signal in pipe 62 and in the balancing device 7' thereof. In an arrangement such as shown in Fig. 9, it will be understood that receiver 1b may be located at a substantial distance from sender 1a; likewise, sender 1c may be located at a substantial distance from receiver 1b and receiver 1b in turn may be located at a substantial distance from sender 1c. Thus, it is possible to transmit over long distances, the effect of an input signal X and convert it into a control or indicating force or pressure or impulse at a remote point Y.

In Figure 10 is illustrated a sender 1 like the one shown and described in connection with Fig. 1, and a receiver 2A. Receiver 2A is so arranged that the output signal or pressure developed in pipe 62A by valve 60A will vary as the square of the current output of differential transformer 8 of the sender 1. Receiver 2A is equipped with a pneumatic balancing device 7A such as the device 7' shown and described in connection with the receiver 2 of Fig. 1, but is provided with a modified electromagnetic device 9A. Electromagnetic device 9A comprises a coil winding 70 and an armature 71 constructed of such magnetic material that the flux developed in it by the coil winding will be proportional to the value of the ampere turns of coil winding 70 at any instant. As shown, the armature and coil are movable relative to one another and one of them may be secured in a stationary position, and the other secured to beam 3A. As shown, the coil winding is mounted on base 6A while the armature is secured to beam 3A. Since the flux through the armature varies with the value of current in the coil winding 70, the force exerted by the armature on beam 3A will vary as the square of the current in the winding 70. Since beam 3A will turn on its fulcrum until there is a balance between the forces exerted by balancer 7A and armature 71 on beam 3A, it follows that the pressure that will be established in pipe 62A by valve 60A and in balancing device 7A for any value of current in winding 70 will be proportional to the square of that current.

In Figure 1 is shown an arrangement utilizing a sender 1 and a modified receiver 2B. Receiver 2B is provided with an electromagnetic device 9B arranged to receive as input, the electric output of the differential transformer 8 of sender 1 and it is provided with an electromagnetic balancing device 74 which is energized by the current output of differential transformer 8B thereof. The forces exerted by devices 9B and 74 oppose each other about a double-acting fulcrum comprising spaced knife edges 4a and 4b between which beam 3B is disposed. The forces developed by devices 9B and 74 on the beam are taken by the upper knife edge 4a, knife edge 4b merely taking the dead weight of the beam and the parts supported thereon. The output of differential transformer 8 of sender 1 is passed through the coils of devices 9 and 9B of sender 1 and receiver 2B, respectively, in series, as in the case of Figure 1, for example. Movement of beam 3B results initially from the force of device 9B and is in a clockwise direction. Therefore, core 22B of differential transformer 8B moves downwardly and transformer winding 18B supplies the predominant part of the output voltage. The output of the secondary winding 18B is amplified and passed through the coil winding 76 of device 74. Since the core or armature 77 is one which is magnetized in proportion to the ampere turns of winding 76, the pull of core 77 will vary as the square of the current input to device 9B of receiver 2B.

If the current input to coil 47'B of device 9B is I and the current output of winding 18B is $I_2$, it follows that force developed by current I is balanced by a force that is proportional to $(I_2)^2 \therefore I_2 = \sqrt{I}$. Since $I_2$ is proportional to the input signal to sender 1 and if the input signal is proportional to a pressure differential $(P_1-P_2)$ produced by the flow of a fluid or gas through an orifice, it follows that $I_2$ is proportional to $\sqrt{P_1-P_2}$, a value which is linearly proportional to the rate of flow that developed the differential $(P_1-P_2)$.

In order that the voltage output of winding 19B may not become operative as the dominant output winding, a stop 79 is provided that limits upward movement of beam 3B to a point where the core 22B will come to rest at its zero point and not pass through the same and cause a reversal of such output voltage. The current output of differential transformer 8B as amplified may be indicated or recorded by a meter 80. The current output may also be utilized for control or regulating purposes, as will be understood by those skilled in this art.

Having thus described the invention as illustrated in various modifications or embodiments thereof, it will be apparent to those skilled in this particular art that the specific embodiments illustrated may be modified and changed without departing from either the spirit or the scope of the invention. Therefore, what is claimed as new, and desired to be secured by Letters Patent, is:

1. A device having means for receiving a pressure of variable magnitude, means for converting said pressure to an electric current output and electromagnetic means responsive to the current output for balancing the pressure input, said device comprising a beam provided with a fulcrum on which said beam may turn, a pressure input device having a deflectable member coupled to said beam and arranged to exert a force thereon of a magnitude that is proportional to the pressure input to said device, an alternating current differential transformer actuated by said beam adapted to develop an output electric current whose value is proportional to the deviation of said beam in one direction from a predetermined position, means for amplifying and rectifying said electric output, an electromagnetic device comprising a permanent magnet and a coil winding disposed to be energized in proportion to the current output of said differential transformer, said coil winding and magnet being movable relative to one another, one of them being coupled to said beam to exert a force thereon that opposes and balances the force exerted thereon by said pressure deflectable member.

2. A device according to claim 1, characterized by the fact that an adjustable shunt resistance is connected in parallel with said coil winding whereby the force exerted by said coil winding on said beam may be adjusted with respect to the current output of said differential transformer.

3. A device according to claim 1, characterized by the fact that a viscous damping means is connected to said beam to stabilize movement thereof about its fulcrum and consequently the output current of said differential transformer.

4. A device according to claim 1, characterized by the fact that means are provided for so limiting the movement of the beam in one direction that the current output of said differential transformer will vary only between zero and one maximum value.

5. A device according to claim 1, characterized by the fact that the differential transformer comprises a primary winding and two secondary windings connected in opposition to each other and inductively coupled to said primary winding, and a movable magnetic core within said windings and connected to said beam to be actuated thereby from a position in which the output of said secondary windings is substantially zero and a position in which the induction in one of said secondary windings is a maximum and the induction in the other is a minimum, and stop means for preventing movement of said beam and core past the zero induction position as the beam moves in a direction from said maximum induction position to said zero induction position.

6. A control device having electromagnetic force-producing means adapted to be energized by a variable current input, means for converting said input to a pressure output whose magnitude varies with the magnitude of said current input and means responsive to said pressure output for developing a force that balances the force of said electromagnetic means, said device comprising a beam provided with a fulcrum on which said beam may turn, an electromagnetic device comprising a permanent magnet and a coil winding in the field of said magnet and movable relative thereto, one of which is connected to said beam and disposed to exert a turning force thereon that is proportional to the value of current traversing said coil winding, an escapement valve disposed to be actuated by said beam and adapted to establish an output pressure that varies in magnitude with the turning of said beam, and a pressure-receiving device having a pressure deflectable member disposed to exert a force on said beam in a direction opposing and balancing the force exerted by the electromagnetic device thereon, the value of said pressure being proportional to the magnitude of current in said coil winding.

7. A device for receiving a variable signal input and converting the input to an output that varies in magnitude with the input, said device comprising a beam having a fulcrum, a signal input device including means for exerting a force on said beam that is proportional in magnitude to the magnitude of said input and tending to turn the same in one direction, an output device actuated by said beam comprising a differential transformer having a primary winding and two secondary windings disposed one on each side of the primary winding, the coils being disposed in axial alignment, the secondary windings being connected to each other in such fashion that the voltages induced therein oppose each other, and a core disposed for movement within and axially of coils, said core being connected to said beam, the voltage output of said secondary windings being zero when the movable core is in neutral position with respect to said primary and secondary windings and being greater than zero when the core is in greater flux linking relation with one of said secondary windings than with the other, means for limiting movement of the core from said neutral position in a direction in which the core has predominant flux linking relation with only one of said secondary windings, an amplifier and rectifying means for amplifying and rectifying the output of said secondary windings, and a permanent magnet having a coil winding disposed in the field thereof and connected to said beam to exert a turning force thereon in a direction that opposes the turning force of the signal input responsive means, said coil winding being energized by said amplified and rectified output to a value at which the beam is in balance with the said turning forces.

8. A device according to claim 7, characterized by the fact that the signal input responsive means comprises a chamber to which a variable pressure medium may be supplied, said chamber having a flexible member disposed to exert a force on said beam whose magnitude is proportional to the magnitude of said input pressure.

9. A device according to claim 7, characterized by the fact that the electromagnetic means comprises a permanent magnet having a cylindrical member of magnetizable material, a magnetic plate across one end of said cylindrical member, a pole piece of magnetic material disposed across the opposite end of said cylindrical member, said pole piece having a central aperture therein, and a core member within said cylindrical member and secured at one end to said plate, said core member having at its opposite end a cylindrical section located in said aperture in spaced relation to the edge thereof thereby forming an air gap, and a coil winding in said aperture embracing the cylindrical section of said core, said winding being secured to said beam, the permanent magnet being supported in a stationary position relative to said coil winding and beam.

10. A control system comprising a variable signal input sender and a receiver adapted to receive the output of said sender and convert the same into a control force whose magnitude varies as a function of the signal input, said sender comprising a beam having a fulcrum, a pressure-actuated member adapted to receive a pressure input of variable magnitude and exert a force proportional to said pressure on said beam tending to turn it in one direction about said fulcrum, a differential alternating current transformer having input and output windings and a movable core member actuated by said beam to cause the current output to vary in magnitude with the magnitude of said input signal, an electromagnetic device having a movable coil winding energized by said transformer output arranged to exert a turning force on said beam that opposes the turning force of said input signal device; said receiving device comprising a beam having a fulcrum, an electromagnetic device having a coil winding disposed to exert a turning force on said beam in one direction, the coil windings of said receiver and sender being connected in series circuit with the output winding of said differential transformer, means actuated by the beam of said receiver for developing a control force that is proportional to the movement imparted to said beam by the coil winding of said electromagnetic device and means energized by said control force arranged to exert a turning force on said beam that opposes and balances the beam against the turning force of said coil winding.

11. A system according to claim 10, characterized by the fact that the control force producing means of said receiver comprises an escapement valve adapted to transmit a pressure to a sending line that varies in magnitude with movement of said beam and a pressure-actuated device having a pressure chamber connected to the sending pressure of said valve, said chamber having a flexible member therein connected to said beam and exerting thereon a turning force that opposes the turning force of said coil winding, said valve being actuated by said beam to a position at which the sending pressure thereof develops a force that balances the turning force of said coil winding.

12. A system according to claim 10, characterized by the fact that a resistor is connected in shunt across the coil winding of the sender and of the receiver, respectively, the resistance of each resistor being of such value that the values of the input signal to the sender corresponds substantially value for value with the values of the output control force of the receiver.

13. A system according to claim 10, characterized by the fact that the output control force producing means of the receiver comprises a differential transformer adapted to produce an alternating current output that varies with movement of said beam produced by the coil winding thereon, and an electromagnetic balancing means comprising a coil winding having an armature of magnetizable material disposed to be magnetized in accordance with the value of the current output of said differential transformer, said coil winding being supported in a fixed position relative to the beam and the armature being connected to said beam and disposed to exert a turning force on said beam that opposes the turning force of the first-mentioned coil winding, the force exerted on the beam of the first-mentioned electromagnetic device being linearly proportional to the magnitude of the current traversing the same and the force of said balancing means being proportional to the square of the transformer output current, whereby the value of output current of the transformer is proportional to the square root of the value of current in said other coil winding.

14. A system for transmitting and receiving forces that vary in magnitude with changes in a variable being measured, said system having a variable signal input sender and a receiver, said sender comprising a beam having a fulcrum, means responsive to the magnitude of said measured variable for exerting a turning force on said beam tending to turn it in one direction about said fulcrum, a differential alternating current transformer having input and output windings and a movable core member connected to and actuated by said beam to cause the voltage output to vary in magnitude with the movement of said beam, an electromagnetic device having a movable coil winding and a constant field magnet therefor, said coil winding being disposed to exert a turning force on said beam in a direction opposing the turning force of said signal input means, said receiving device comprising a beam having a coil winding provided with constant field magnet, said winding being disposed to exert a turning force on said beam tending to turn it in one direction about said fulcrum, means connecting the coil windings of said sender and receiver in series, means for amplifying the output voltage of said differential transformer, means for rectifying said amplified voltage, said series connected coil windings being connected to said rectified voltage, means actuated by the receiver beam for developing an output signal, means responsive to said output signal for exerting a turning force opposing the force of said coil winding, thereon, and means for limiting movement of said sender beam between positions corresponding to output voltages of said differential transformer that lie between zero and a maximum value, the maximum value being always on the same side of zero.

References Cited in the file of this patent

UNITED STATES PATENTS

| | | |
|---|---|---|
| 1,749,015 | Bisbee | Mar. 4, 1930 |
| 2,301,850 | Bjergel | Nov. 10, 1942 |
| 2,383,757 | Ziebolz | Aug. 28, 1945 |
| 2,414,508 | Craig | Jan. 21, 1947 |
| 2,451,425 | Allwein | Oct. 12, 1948 |
| 2,454,946 | Rosenberger | Nov. 30, 1948 |
| 2,495,844 | Hornfeck | Jan. 31, 1950 |
| 2,546,657 | Smoot | Mar. 27, 1951 |
| 2,579,723 | Best | Dec. 25, 1951 |
| 2,598,258 | Hoffman | May 27, 1952 |
| 2,662,540 | Rutherford | Dec. 15, 1953 |

OTHER REFERENCES

Ser. No. 421,940, Kool et al. (A. P. C.), published May 25, 1943.